United States Patent
Lepine et al.

(10) Patent No.: US 9,089,805 B2
(45) Date of Patent: Jul. 28, 2015

(54) AIR FILTER AND INLET TUBE ASSEMBLY

(71) Applicants: Kristopher W. Lepine, Kearney, NE (US); Jeffrey E. Rogers, Kearney, NE (US)

(72) Inventors: Kristopher W. Lepine, Kearney, NE (US); Jeffrey E. Rogers, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 63 days.

(21) Appl. No.: 13/926,769

(22) Filed: Jun. 25, 2013

(65) Prior Publication Data

US 2014/0373494 A1    Dec. 25, 2014

(51) Int. Cl.
  *B01D 46/00*  (2006.01)
  *B01D 46/24*  (2006.01)

(52) U.S. Cl.
  CPC ........ *B01D 46/2414* (2013.01); *B01D 46/0004* (2013.01); *B01D 46/0005* (2013.01); *B01D 46/2411* (2013.01); *B01D 2201/291* (2013.01); *B01D 2201/34* (2013.01); *B01D 2271/022* (2013.01); *B01D 2271/027* (2013.01)

(58) Field of Classification Search
  CPC ........... B01D 46/0004; B01D 46/0005; B01D 46/2411; B01D 46/2414; B01D 2271/022; B01D 2271/027; B01D 2201/291; B01D 2201/304; B01D 2201/34; B01D 2201/342; B01D 2201/347
  See application file for complete search history.

(56) References Cited

U.S. PATENT DOCUMENTS

| | | |
|---|---|---|
| 4,878,930 A | 11/1989 | Manniso et al. |
| D317,965 S | 7/1991 | Svensson |
| D320,062 S | 9/1991 | Meissner |
| D321,745 S | 11/1991 | Murrell |
| 5,082,476 A * | 1/1992 | Kahlbaugh et al. ............. 95/287 |
| 5,336,405 A | 8/1994 | Tang et al. |
| 5,779,903 A | 7/1998 | Smith et al. |
| 6,158,592 A | 12/2000 | Reinhart et al. |
| 6,537,339 B2 | 3/2003 | Schmitz et al. |
| D477,659 S | 7/2003 | Gieseke et al. |
| 6,626,299 B1 | 9/2003 | Brown et al. |
| D528,630 S | 9/2006 | Booth |
| 7,232,522 B1 | 6/2007 | Lasley et al. |
| D546,412 S | 7/2007 | Kennedy et al. |
| D626,208 S | 10/2010 | Clements |
| 8,070,945 B2 | 12/2011 | Stankowski et al. |
| 8,167,966 B2 | 5/2012 | Amirkhanian et al. |
| D666,704 S | 9/2012 | Osendorf et al. |
| D672,447 S | 12/2012 | Yano et al. |
| D691,252 S | 10/2013 | Moredock et al. |
| 2002/0162309 A1* | 11/2002 | Schmitz et al. ................. 55/423 |
| 2004/0068970 A1* | 4/2004 | Hasegawa et al. ............. 55/498 |
| 2004/0134171 A1* | 7/2004 | Scott et al. ..................... 55/482 |
| 2008/0041026 A1 | 2/2008 | Engel et al. |
| 2010/0037570 A1 | 2/2010 | Osendorf et al. |
| 2010/0282652 A1 | 11/2010 | Lepine et al. |
| 2014/0102060 A1* | 4/2014 | Kato et al. ..................... 55/502 |

* cited by examiner

*Primary Examiner* — Robert Clemente
(74) *Attorney, Agent, or Firm* — Reinhart Boerner Van Deuren P.C.

(57) ABSTRACT

A filter assembly and filter element are provided. The filter assembly includes a housing with a filter element disposed therein. The filter assembly also includes a separate and removable inlet tube which projects from an interior of the housing to an exterior of the housing through an opening in a lid of the housing. The filter element includes a ring of filter media with upper and lower end cap constructions attached to opposed ends of the ring of filter media. The upper end cap construction includes a base portion and an axial seal portion extending axially from the base portion. The lower end cap construction includes a support ring and a resilient portion.

7 Claims, 11 Drawing Sheets

AIR FILTER AND INLET TUBE ASSEMBLY

FIELD OF THE INVENTION

This invention generally relates to filtration systems, and more particularly to filter elements and filter assemblies which incorporate one or more filter elements situated within a housing.

BACKGROUND OF THE INVENTION

Contemporary filter assemblies for filtering a fluid, e.g. air, typically include a housing with one or more replaceable filter elements situated within the housing. The filter element is typically replaced at predetermined maintenance intervals, or when it is otherwise no longer serviceable. Although there are a number of different flow patterns that may be utilized, many filter assemblies include a radial flow path, wherein fluid passes radially through a ring of filter media of the filter element.

The above referenced radial flow path is typically arranged such that fluid passes through a housing inlet and then radially from an exterior of the ring of filter media to an interior of the ring of filter media and as a result is cleaned. Thereafter, the fluid passes from the interior of the ring of filter media to an outlet of the filter housing and is thereafter utilized in its intended application.

It is also possible for the above referenced radial flow path to be reversed, i.e. wherein the fluid first enters an inlet of the housing and passes into an interior of the ring of filter media. Thereafter, the fluid flows radially outward through the wall of the ring of filter media and is cleaned. Once cleaned, the fluid then flows to an outlet of the housing and is thereafter utilized in its intended application. While such configurations have been utilized, it is desirable that the same are improved for purposes of cost, complexity in assembly, and service life.

The invention provides such an improved filter element and filter assembly. These and other advantages of the invention, as well as additional inventive features, will be apparent from the description of the invention provided herein.

BRIEF SUMMARY OF THE INVENTION

In one aspect, a filter assembly is provided. An embodiment of such a filter assembly includes a housing having a body and a lid axially removable from the body. The lid has an opening therethrough. The body defines an outlet. A flow path of the filter assembly extends between the opening and the outlet. A filter element is carried within the housing and disposed along the flow path. The filter assembly also includes a separate and removable inlet 2. A tube portion of the inlet tube extends through the opening of the lid. A flange portion of the inlet tube is axially interposed between an interior axially facing surface of the lid and an axially facing surface of an upper end cap construction of the filter element such that a lower-most axial extent of the inlet tube is supported by the upper-most axially facing surface of the upper end cap construction.

In certain embodiments, the flange portion of the inlet tube is stepped such that it defines a shoulder. The shoulder partially extends into the opening of the lid and is circumscribed thereby such that the shoulder is radially interior of the opening. The inlet tube includes an axially facing abutment surface on an underside of the flange portion. The abutment surface is in contact with a plurality of radially inwardly extending projections formed on the upper end cap construction. The flange portion extends radially outward from the tube portion of the inlet tube.

In certain embodiments, the upper end cap construction includes an axial seal projection for axially sealing against the interior axially facing surface of the lid. The filter element also includes a lower end cap construction. The lower end cap construction includes a radial seal projection for radially sealing against an interior radially facing surface of the body of the housing. The flange portion of the inlet tube terminates at a radial extent that is radially inward of and adjacent to the axial seal projection of the upper end cap construction.

In another aspect, a filter element is provided. An embodiment of such a filter element includes a ring of filter media having a first axial end and a second axial end. An upper end cap construction is integrally attached to the first end. The upper end cap construction comprises a base portion and an axial seal portion extending axially from the base portion. The axial seal portion includes a seal bead configured for axially sealing against an axially facing surface. The axial seal portion includes a plurality of radially inwardly extending projections. The projections are configured and arranged for axially supporting an inlet tube. The filter element also includes a lower end cap construction that is integrally attached to the second end. The lower end cap construction includes a support ring and a resilient portion supported in part by the support ring. The resilient portion includes a radial seal projection configured for radially sealing against a radially facing surface.

In certain embodiments, the base portion of the upper end cap construction is formed of a first urethane, and the seal portion of the upper end cap construction is formed of a second urethane that is less dense than the first urethane. The resilient portion of the lower end cap construction is formed of a third urethane that is less dense than the first urethane. The support ring of the lower end cap construction is formed from a rigid plastic. The support ring includes a plurality of hooks which overlap the second end of the ring of filter media to axially locate the support ring. The support ring also includes an axially facing support surface which extends radially inward of an inner-most periphery of the ring of filter media. The resilient portion of the lower end cap construction is situated on and supported by the support surface of the support ring such that a portion of the resilient portion of the lower end cap construction extends radially inward of the inner periphery of the ring of filter media.

In another aspect, a filter element is provided. An embodiment of such a filter element includes a ring of filter media having a first axial end and a second axial end. An upper end cap construction is integrally attached to the first axial end. The upper end cap construction includes a base portion and an axial seal portion extending axially from the base portion. The axial seal portion includes a seal bead configured for axially sealing against an axially facing surface. The base portion is formed of a first urethane and the axial seal portion is formed of a second urethane which is less dense than the first urethane. A lower end cap construction is integrally attached to the second end and comprises a support ring and a resilient portion supported in part by the support ring. The resilient portion is formed of a third urethane which is less dense than the first urethane.

In certain embodiments, the first urethane has a density of about 23 to about 31 pounds per cubic foot, the second urethane has a density of about 13 to about 20 pounds per cubic foot, and the third urethane has a density of about 11 to about 16 pounds per cubic foot.

In certain embodiments, the axial seal portion includes a plurality of radially inwardly extending projections which project from the seal bead. The projections are configured and arranged for axially supporting an inlet tube.

In certain embodiments, the third urethane has the same density as the second urethane.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
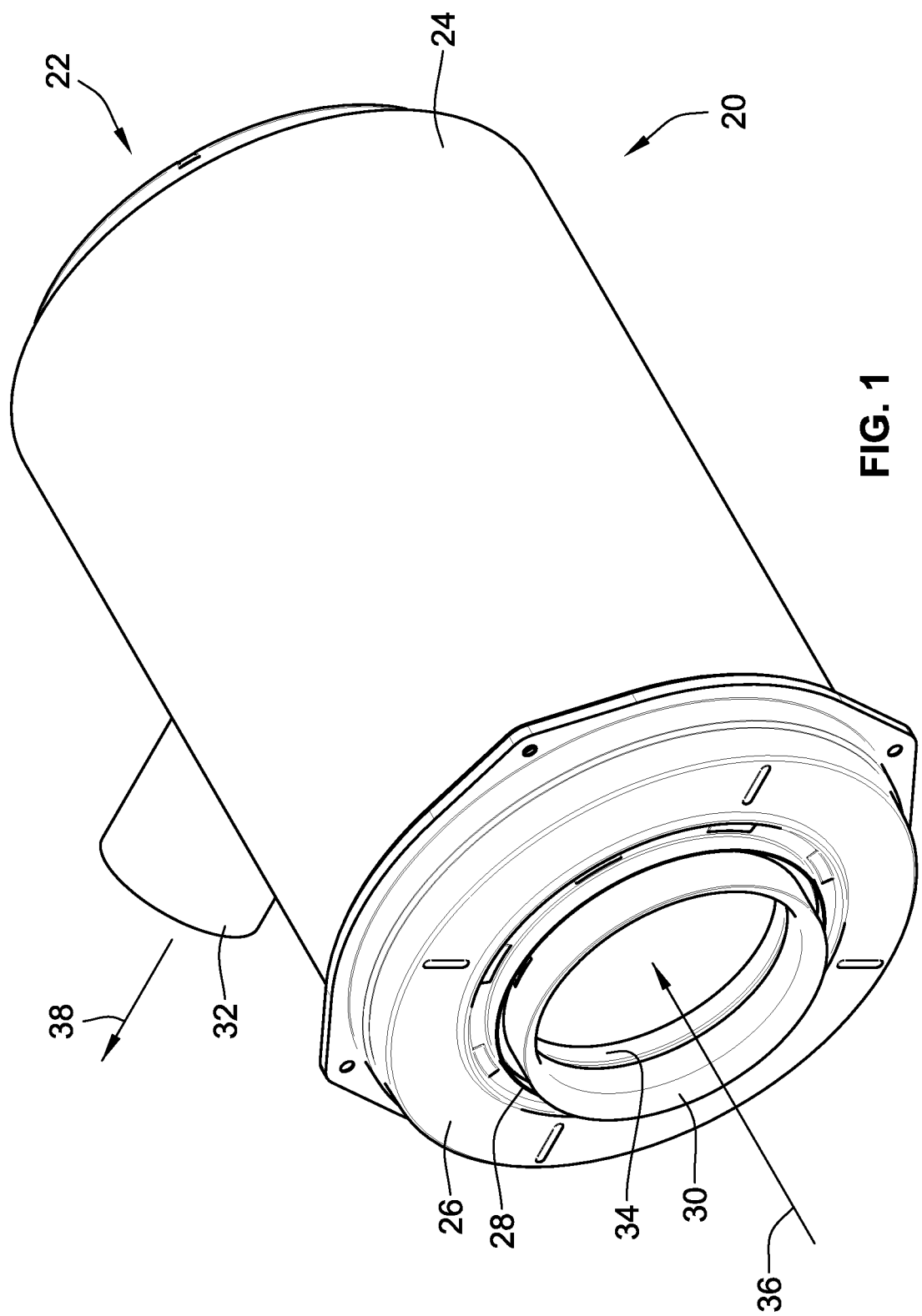
FIG. 1 is a perspective view of an embodiment of a filter assembly according to the teachings of the present invention.

Turning now to the drawings, the same illustrate one embodiment of a filter assembly 20 according to the teachings of the present invention. With particular reference now to FIG. 1, filter assembly 20 includes a housing 22. Housing 22 includes a body 24 and a lid 26 which is removable from body 24.

Lid 26 includes an inlet port 28 through which a separate and removable inlet tube 30 extends through. Body 24 includes a radially extending outlet 32. In operation, fluid enters fluid assembly 20 along inlet direction 36, is filtered through a filter element 34 disposed within housing 22, and then passes through outlet 32 along outlet direction 38.

Figure 2:
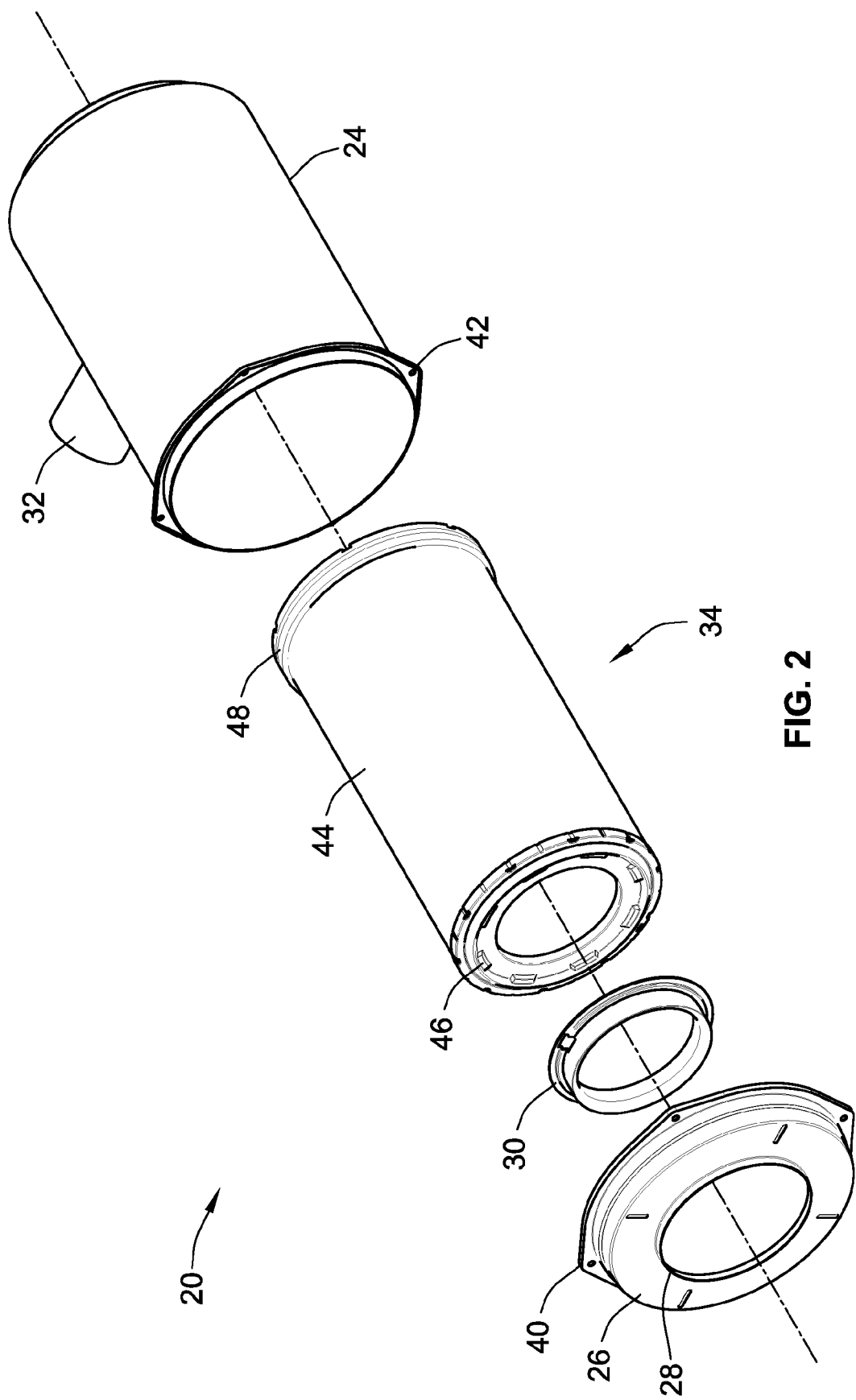
FIG. 2 is an exploded perspective view of the embodiment of FIG. 1.

With reference now to FIG. 2, lid 26 includes a mounting flange 40. Body 24 also includes a mounting flange 42. Mounting flanges 40, 42 mate with one another to axially bias lid 26 against body 24. Such axial biasing may be achieved by screws, clamps, or other hardware sufficient to axially bias lid 26 against body 24 in a fixed position.

Filter element 34 includes a ring of filter media 44. Filter media 44 may be, for example, a ring of pleated filter media. Those skilled in the art will recognize, however, that various other types of filter media may be utilized. Additionally, safety filters and/or liners may be incorporated with filter element 34 depending upon the application thereof. Although filter element 34 is shown as a ring of filter media with end cap constructions at either end, those skilled in the art will recognize that it may also include other componentry, e.g. an integral center tube, an outer wrapper, etc.

Figure 3:
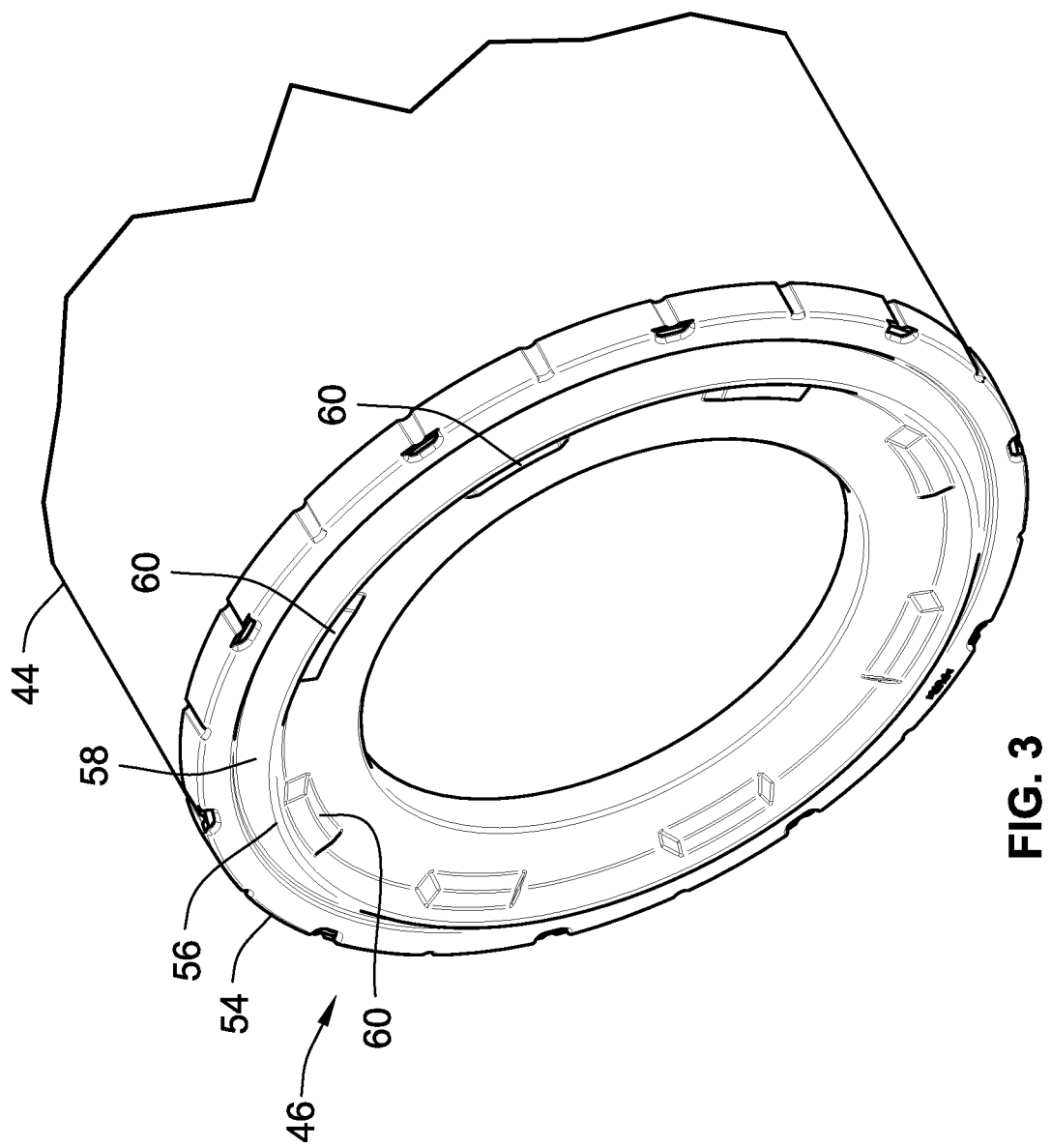
FIG. 3 is a perspective view of an upper end cap construction of a filter element of the filter assembly of FIG. 1.

Filter media 44 includes first and second axial ends. An upper end cap construction 46 is attached to the first axial end. A lower end cap construction 48 is attached to the second axial end. With reference now to FIG. 3, upper end cap construction 46 includes a base portion 54 formed of a first urethane material, and an axially extending seal portion 56 extending from base portion 54, which together define an upper most axially facing surface upper end cap construction 46. The axially extending seal portion 56 includes a seal bead 58 for forming an axial seal with housing 22, and a plurality of radially inwardly extending projections 60 which extend from seal bead 58. While shown as projecting directly from seal bead 58, in other embodiments, projections 60 may be stand alone projections that are not directly connected to seal bead 58 so as to project therefrom. Axial seal portion 56 is formed of a second urethane which is less dense than the first urethane used to form base portion 54. In an exemplary embodiment, the first urethane has a density of about 23 to about 31 pounds per cubic foot, and more particularly, about 24.01 to about 30.34 pounds per cubic foot. The second urethane has a density of about 13 to about 20 pounds per cubic foot, and more particularly, about 14.17 to about 18.09 pounds per cubic foot. In other embodiments as discussed below, the upper end cap may be formed from a single urethane and may additionally include an internally disposed support frame for supporting axial seal portion 56 during sealing. Additionally, other types of urethanes are of course contemplated, and the aforementioned specifications of urethanes are provided for exemplary purposes only.

Figure 4:
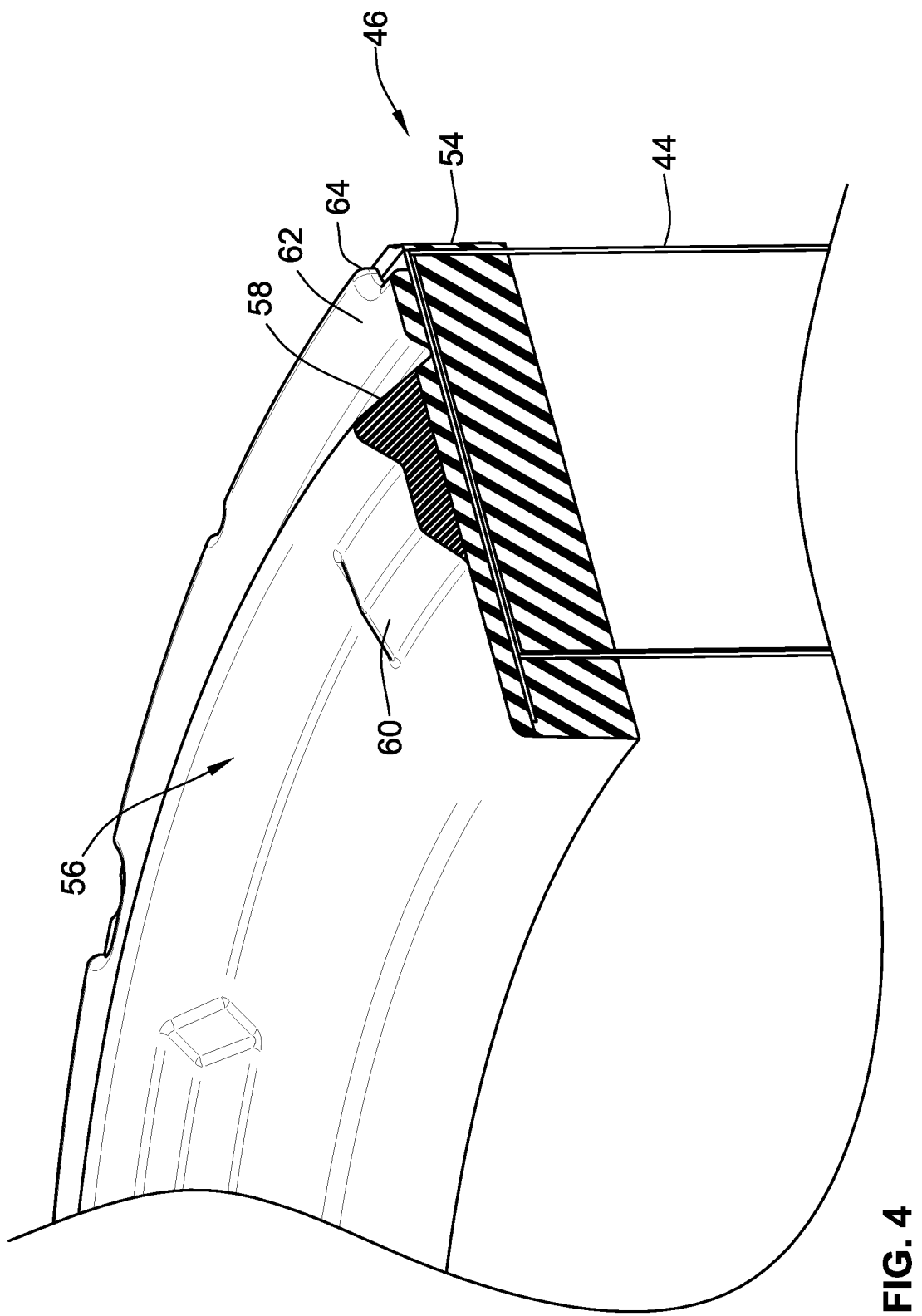
FIG. 4 is a perspective cross section of the upper end cap construction of FIG. 3.

Turning now to FIG. 4, the above introduced dual material upper end cap construction 46 is shown in cross-section. As can be seen in this figure, axial seal portion 56, and more particularly seal bead 58 and projections 60 thereof are formed on top of base portion 54. Base portion 54 may also include an outer most ring 62 which surrounds axial seal portion 56 and also includes a plurality of media standoff apertures 64. Also as shown in this figure, base portion 54 is integrally attached filter media 44 such that it axially seals the same. In other words, no additional frame members or the like are required for attaching upper end cap construction 46 to filter media 44.

Figure 5:
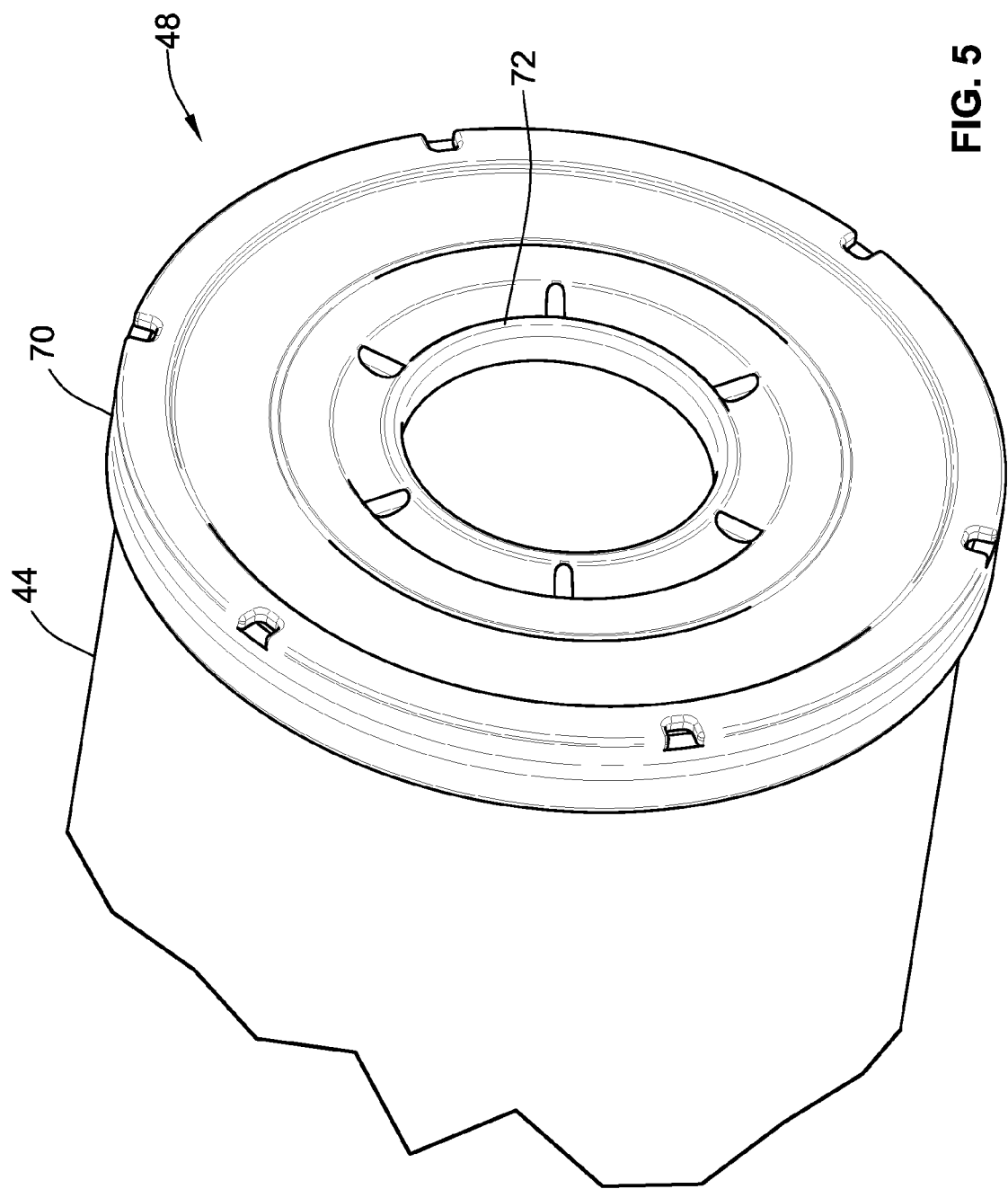
FIG. 5 is a perspective view of a lower end cap construction of the filter element of the filter assembly of FIG. 1.
Figure 6:
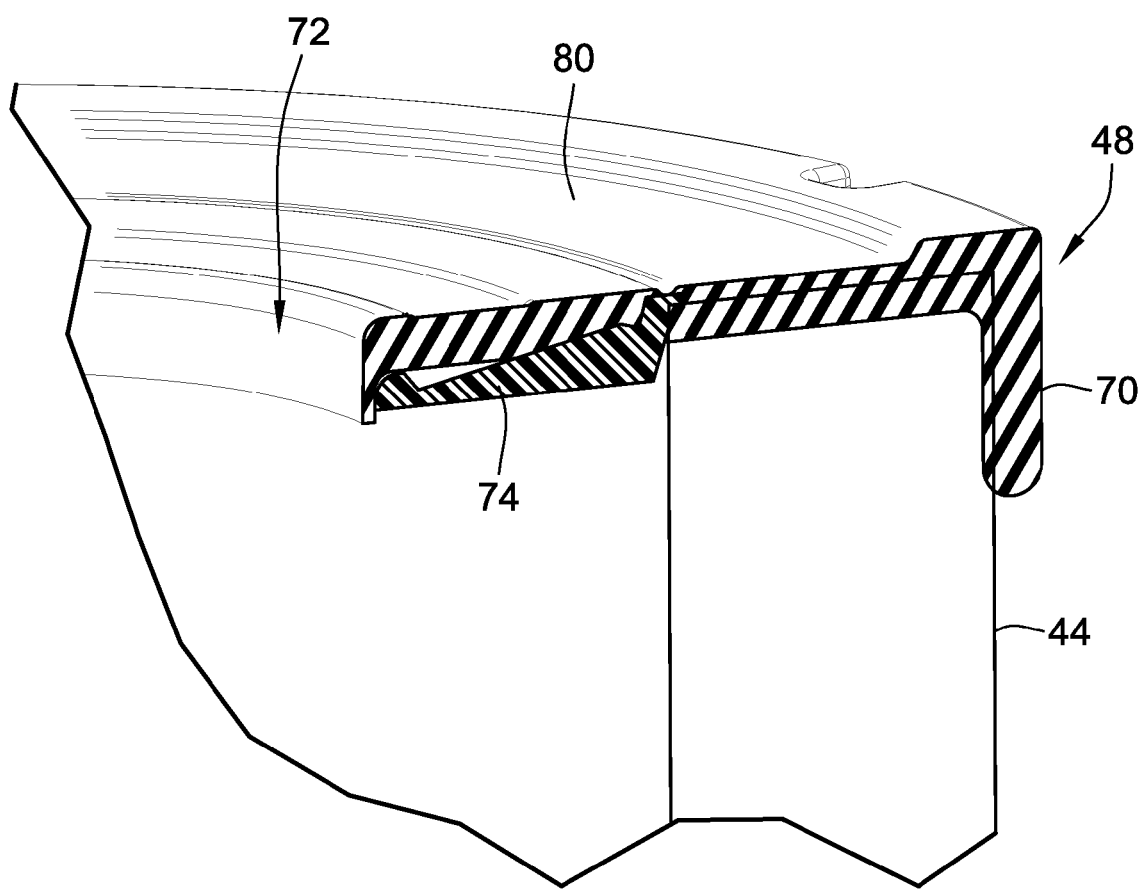
FIG. 6 is a perspective cross section of the lower end cap construction of FIG. 5.

Turning now to FIG. 5, lower end cap construction 48 is shown in greater detail. Lower end cap construction 48 defines a radial seal projection 70 for radially sealing against a radially facing interior surface of housing body 24 (See also FIG. 11). Lower end cap construction 48 also includes an aperture 72 formed in the center thereof Turning now to FIG. 6, lower end cap construction 48 is shown in cross-section in greater detail. Lower end cap construction 48 includes a support ring 74 for supporting a resilient portion 80 of lower end cap construction 48. Resilient portion 80 is formed of a urethane which has a density of about 11 to about 16 pounds per cubic foot, and more particularly, about 12.27 to about 15.44 pounds per cubic foot. Resilient portion 80 is integrally attached to filter media 44 such that it axially seals the second end of filter media 44. In other embodiments, the lower end cap construction may be formed of a urethane having the same density as either of the urethane formulations used for the upper end cap construction. Additionally, other types of urethanes are of course contemplated, and the aforementioned specifications of urethanes are provided for exemplary purposes only.

Figure 7:
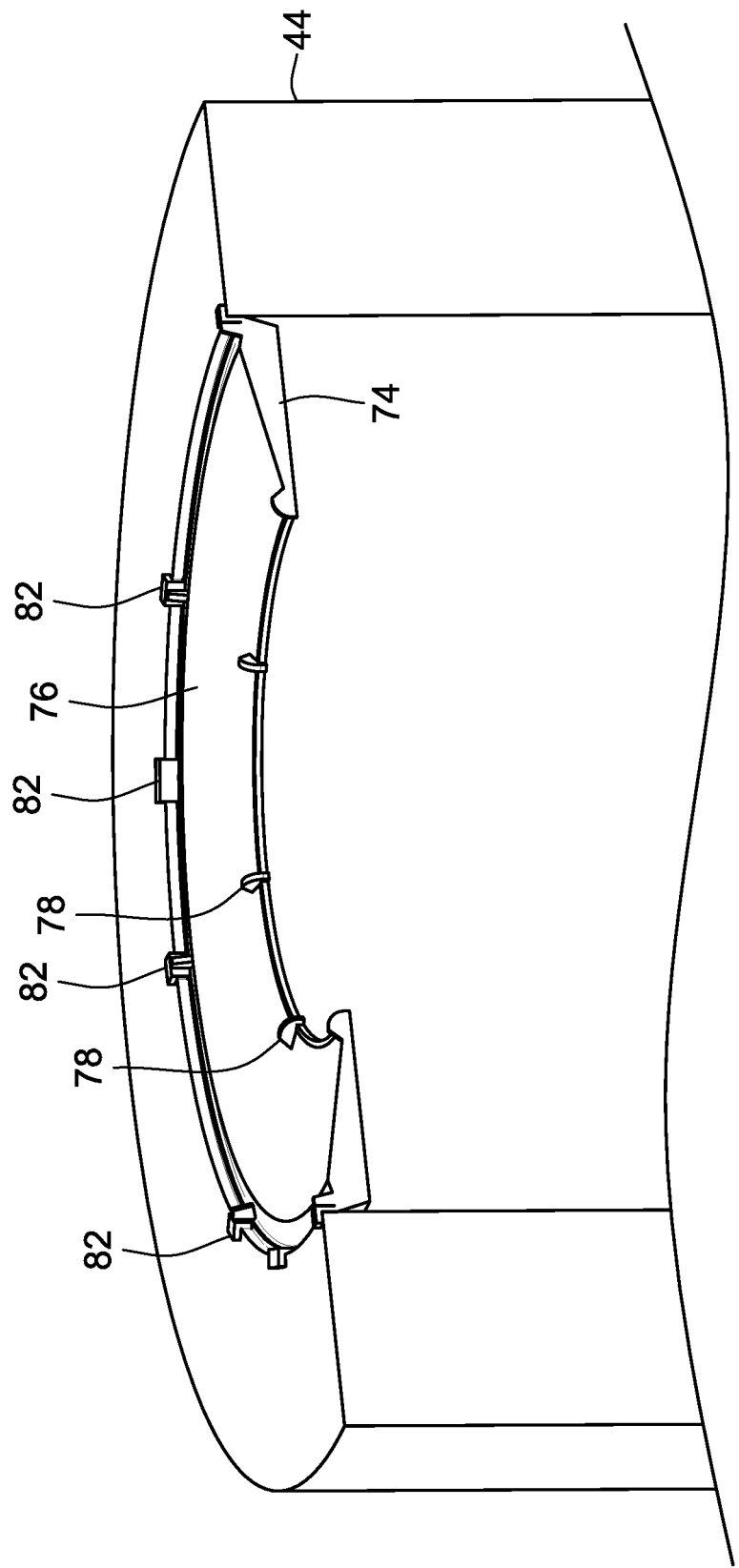
FIG. 7 is a perspective cross section of a support ring of the lower end cap construction of FIG. 5.

Turning now to FIG. 7, support ring 74 is shown in an exposed cross-section for purposes of clarity. Support ring 74 includes a support surface 76 which extends radially inward of an inner periphery of filter media 44 as shown. A plurality of fingers 78 extend axially away from support surface 76 as shown, and serve to aid in supporting resilient portion 80. Support ring 74 also includes a plurality of radially outwardly extending hook structures 82. As shown, each of hook structures 82 partially overlap the second end of filter media 44. As a result, hook structures 82 serve to axially locate the position of support ring 74 relative to filter media 44. With brief reference back to FIG. 6, resilient portion 80 is formed over hook structures 82, as well as support surface 76 and fingers 78. As a result, resilient portion 80 also extends radially inward of the inner periphery of filter media 44.

Figure 8:
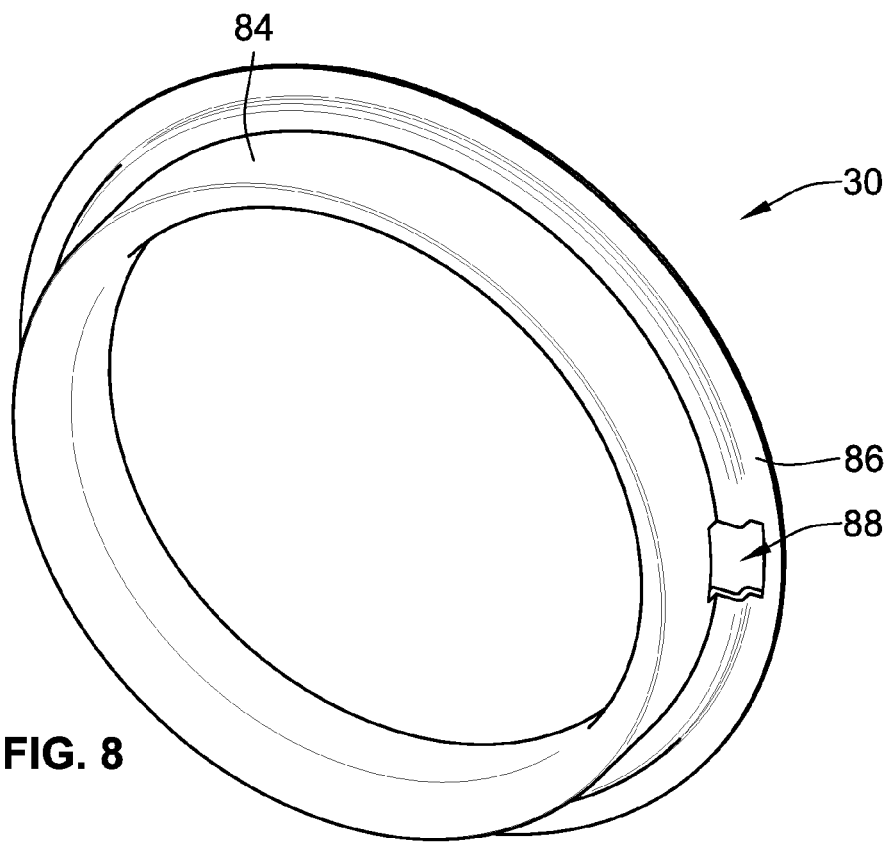
FIG. 8 is a perspective view of an inlet tube of the filter assembly of FIG. 1.
Figure 9:
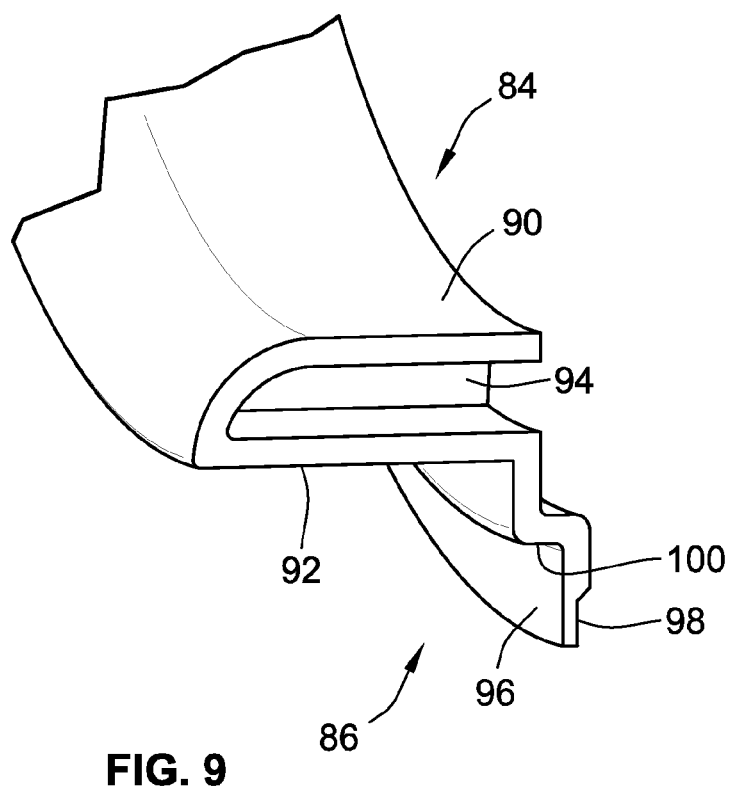
FIG. 9 is a perspective cross section of the inlet tube of FIG. 8.

Turning now to FIG. 8, inlet tube 30 is shown in greater detail. Inlet tube 30 includes a tube portion 84 and a flange portion 86 which extends radially outward from tube portion 84. A drainage port 88 may also be provided in one or both of tube portion 84 and/or flange portion 86 to facilitate drainage. With reference to FIG. 9, tube portion 84 includes an inner and outer wall 90, 92 with a plurality of support ribs 94 positioned therebetween. Flange portion 86 includes an upper contact surface 96 as well as a lower contact surface 98. Flange portion 86 is stepped such that it defines a shoulder 100.

Figure 10:
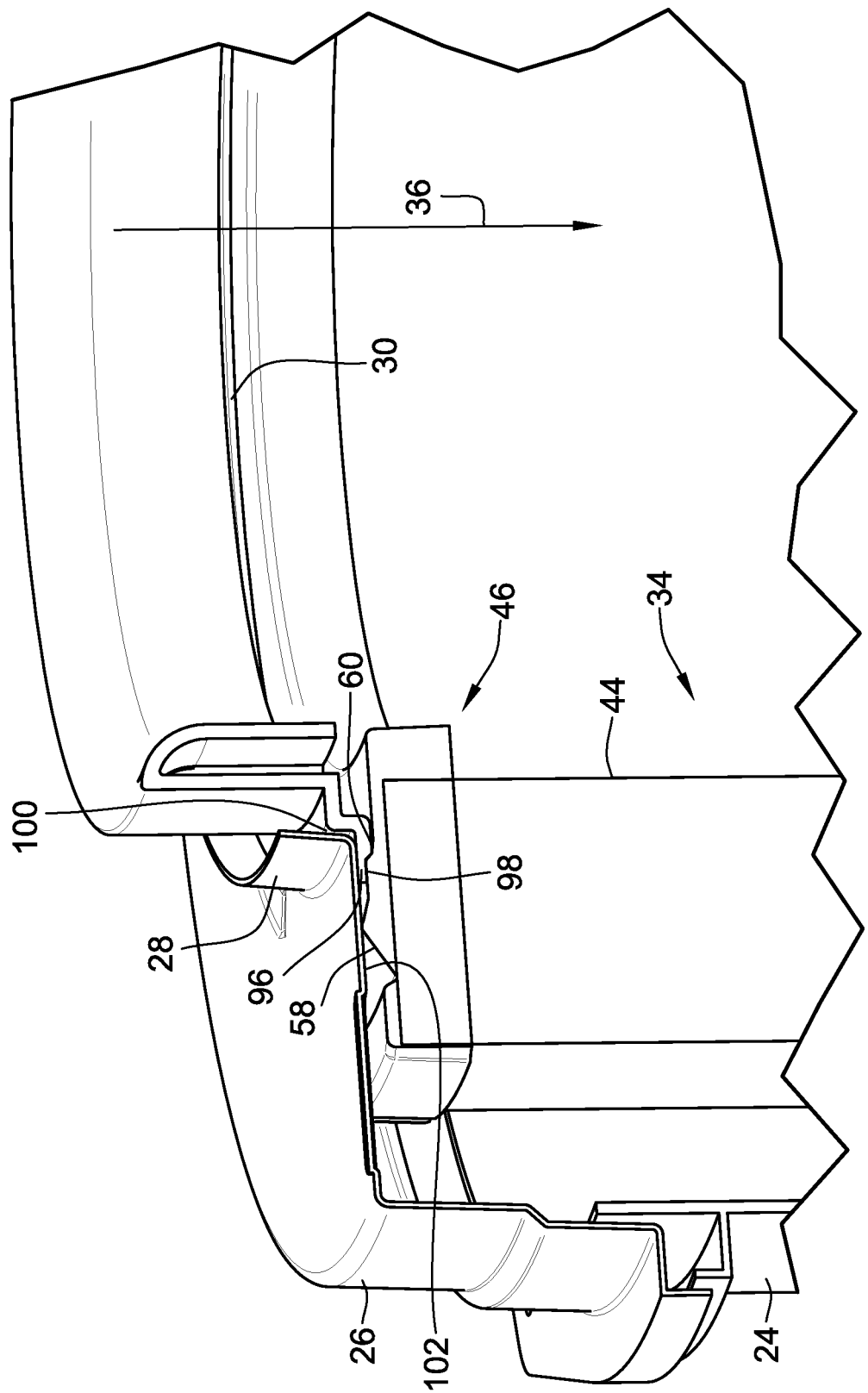
FIG. 10 is a perspective cross section of the upper end cap construction and inlet tube of the filter assembly of FIG. 1 in a sealed configuration.

Turning now to FIG. 10, inlet tube 30 is shown in the context of housing body 24, housing lid 26, and filter element 34. In this installed configuration, upper contact surface 96 of flange portion 86 is in axial contact with an interior axially facing surface of lid 26. Lower contact surface 98 is in axial contact with each of the plurality of radially inwardly extending projections 60 which extend from seal bead 58. Also, shoulder 100 is circumscribed by a radially inwardly facing wall of inlet port 28. As such, shoulder 100 acts to center inlet tube 30 relative to lid 26. Also shown in this figure is the sealing contact made between seal bead 58 and the interior axially facing surface of lid 26. During installation, as lid 26 is moved axially relative to body 24, seal bead 58 is compressed to form an axial seal with lid 26. As such, entering inlet tube 30 along inlet direction 36 is prevented from circumventing filter media 44 prior to exiting filter assembly 20 by way of the aforementioned seal created by seal bead 58, as well as a radial seal effectuated by lower end cap construction 48 as discussed below.

Figure 11:
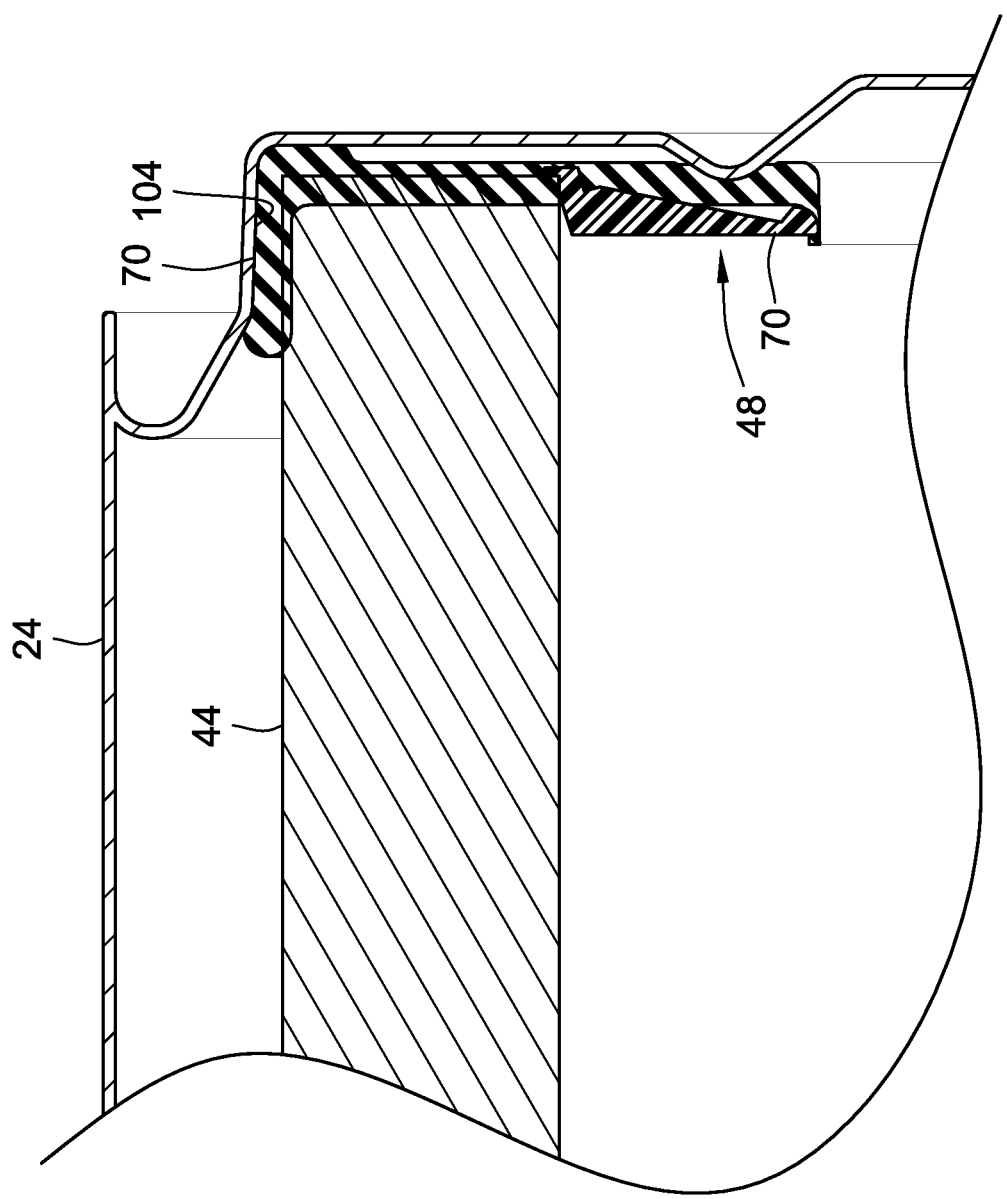
FIG. 11 is a perspective cross section of the lower end cap construction of the filter assembly of FIG. 1 in a sealed configuration.

Turning now to FIG. 11, lower end cap construction 48 is shown in greater detail. As shown in this figure, radial seal projection 70 is in radially sealing contact with an interior radially facing surface 104 of housing body 24. As such, fluid enters filter assembly 20 along inlet direction 36 (See FIG. 10) is also prevented from circumventing filter media 44 by way of the aforementioned radial seal. As a result, fluid is thus forced through filter media 44 before exiting outlet 32 (See FIG. 1) of filter assembly 20.

Figure 12:
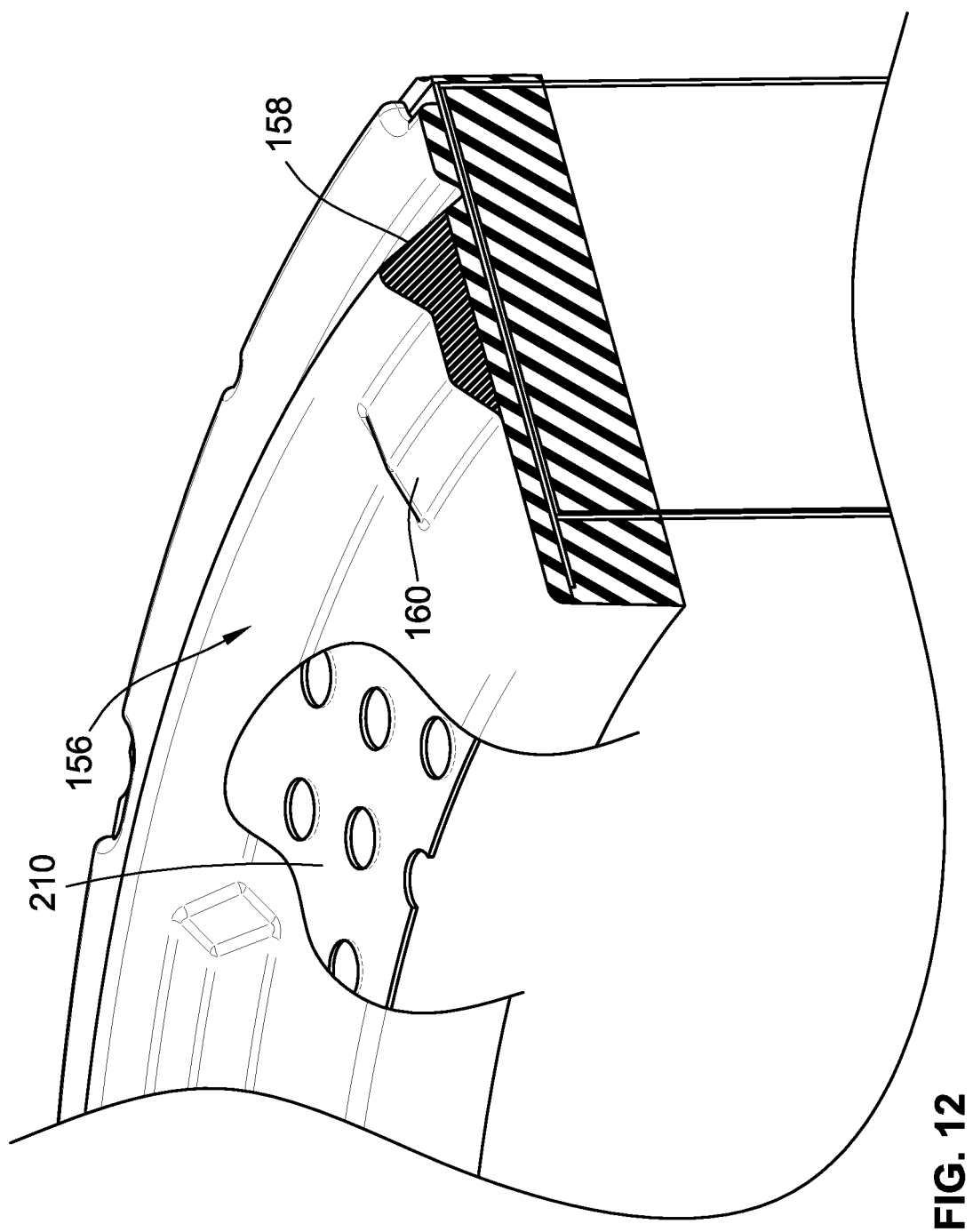
FIG. 12 is a perspective cross section of another embodiment of an upper end cap construction.

With reference now to FIG. 12, another embodiment of an upper end cap construction 146 is illustrated. Similar to that described above with reference to FIG. 4, this embodiment also includes a includes a base portion 154 and an axially extending seal portion 156 extending from base portion 154, which together define an upper most axially facing surface upper end cap construction 146. The axially extending seal portion 156 includes a seal bead 158 for forming an axial seal with housing 22, and a plurality of radially inwardly extending projections 160 which extend from seal bead 158. In this embodiment, upper end cap construction is illustrated as formed by two separate urethane materials as that described above. However, this embodiment may also be formed from a single urethane material, as opposed to two separate materials as described above. This single urethane material, may for example, have a density of about 13 to about 20 pounds per cubic foot, and more particularly, about 14.17 to about 18.09 pounds per cubic foot. Other types of urethanes are of course contemplated, and the aforementioned specifications of urethanes are provided for exemplary purposes only.

Also shown in the embodiment of FIG. 12 is an integrally molded and entirely encapsulated frame member 210. Frame member 210 is a generally rigid structure, and may for example be formed from perforated plastic, or expanded metal. Frame member 210 functions to support axial seal portion 156 during sealing. Frame member 210 may be utilized in the dual-urethane embodiment described above relative to FIG. 4, or the single urethane embodiment described relative to FIG. 12.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
   a ring of filter media having a first axial end and a second axial end;
   an upper end cap construction integrally attached to the first end, the upper end cap construction comprising a base portion and an axial seal portion extending axially from the base portion, the axial seal portion including a seal bead configured for axially sealing against an axially facing surface, and wherein the axial seal portion includes a plurality of radially inwardly extending projections, the projections configured and arranged for axially supporting an inlet tube; and
   a lower end cap construction integrally attached to the second end and comprising a support ring and a resilient portion supported in part by the support ring, the resilient portion including a radial seal projection configured for radially sealing against a radially facing surface.

2. The filter element of claim 1, wherein the base portion of the upper end cap construction is formed of a first urethane, and the seal portion of the upper end cap construction if formed of a second urethane that is less dense than the first urethane.

3. The filter element of claim 2, wherein the resilient portion of the lower end cap construction is formed of a third urethane which is less dense than the first urethane.

4. The filter element of claim 3, wherein the support ring is formed from a rigid plastic.

5. The filter element of claim 1 wherein the support ring includes a plurality of hooks which overlap the second end of the ring of filter media to axially locate the supporting ring.

6. The filter element of claim 5, wherein the support ring includes an axially facing support surface which extends radially inward of an inner-most periphery of the ring of filter media.

7. The filter element of claim 6, wherein the resilient portion of the lower end cap construction is situated on and supported by the support surface of the support ring, such that a portion of the resilient portion of the lower end cap construction extends radially inward of the inner periphery of the ring of filter media.

* * * * *